United States Patent [19]

Hasbun et al.

[11] Patent Number: 5,581,723
[45] Date of Patent: Dec. 3, 1996

[54] METHOD AND APPARATUS FOR RETAINING FLASH BLOCK STRUCTURE DATA DURING ERASE OPERATIONS IN A FLASH EEPROM MEMORY ARRAY

[75] Inventors: Robert N. Hasbun, Shingle Springs; Steven E. Wells, Citrus Heights, both of Calif.

[73] Assignee: Intel Corporation, Santa Clara, Calif.

[21] Appl. No.: 20,204

[22] Filed: Feb. 19, 1993

[51] Int. Cl.$^6$ ................................................. G06F 12/00
[52] U.S. Cl. ........................... 395/430; 395/481; 395/492
[58] Field of Search ................................... 395/425, 575, 395/500, 430, 479, 492, 493, 481; 365/185, 238.5; 371/10.1, 11.1, 21.6; 364/DIG. 1, DIG. 2

[56] References Cited

U.S. PATENT DOCUMENTS

| | | | |
|---|---|---|---|
| 4,456,971 | 6/1984 | Fukuda et al. | 395/439 |
| 4,511,964 | 4/1985 | Georg et al. | 395/410 |
| 4,642,759 | 2/1987 | Foster | 395/500 |
| 4,644,494 | 2/1987 | Muller | 395/425 |
| 4,763,305 | 8/1988 | Kuo | 365/185 |
| 4,802,117 | 1/1989 | Chrosny et al. | 371/10.1 |
| 4,896,262 | 1/1990 | Wayama et al. | 395/500 |
| 4,958,315 | 9/1990 | Balch | 395/500 |
| 4,984,149 | 1/1991 | Iwashita et al. | 395/427 |
| 5,012,425 | 4/1991 | Brown | 364/464.02 |
| 5,047,989 | 9/1991 | Canepa et al. | 365/238.5 |
| 5,053,990 | 10/1991 | Kreifels et al. | 395/427 |
| 5,070,474 | 12/1991 | Tuma et al. | 395/500 |
| 5,077,737 | 12/1991 | Leger et al. | 371/10.1 |
| 5,101,490 | 3/1992 | Getson, Jr. et al. | 395/425 |
| 5,111,385 | 5/1992 | Hattori | 395/425 |
| 5,131,089 | 7/1992 | Cole | 395/500 |
| 5,193,184 | 3/1993 | Belsan et al. | 395/600 |
| 5,199,033 | 3/1993 | McGeoch et al. | 371/10.1 |
| 5,200,959 | 4/1993 | Gross et al. | 371/21.6 |
| 5,210,866 | 5/1993 | Milligan et al. | 395/575 |
| 5,224,070 | 6/1993 | Fandrich et al. | 365/185 |
| 5,226,168 | 7/1993 | Kobayashi et al. | 395/800 |
| 5,268,870 | 12/1993 | Harari | 395/430 |
| 5,301,288 | 4/1994 | Newman et al. | 395/410 |
| 5,388,083 | 2/1995 | Assar et al. | 365/218 |
| 5,404,485 | 4/1995 | Ban | 395/427 |
| 5,459,850 | 10/1995 | Clay et al. | 395/497.02 |

FOREIGN PATENT DOCUMENTS

| | | |
|---|---|---|
| 2088442 | 1/1993 | Canada . |
| 0175458A2 | 3/1986 | European Pat. Off. . |
| 0392895A2 | 10/1990 | European Pat. Off. . |
| 2251324 | 7/1992 | United Kingdom . |
| 2251323 | 7/1992 | United Kingdom . |

OTHER PUBLICATIONS

Robinson, Kurt, "Trends in Flash Memory System Design", Wescon Conference Record, Nov. 1990, pp. 468–472.

Primary Examiner—Rebecca L. Rudolph
Attorney, Agent, or Firm—Blakely, Sokoloff, Taylor & Zafman

[57] ABSTRACT

A method for reliably storing management data in a flash EEPROM memory array, which array is divided into a plurality of individually-erasable blocks of memory cells and in which each of the blocks of memory cells has stored thereon data regarding management of the array during a cleanup process in which valid data stored in a first block is written to another block of the array, and then the first block is erased. The process includes the steps of storing data regarding management of the array from the first block in random access memory and, in an enhanced process, on another block before erasure of the first block. The data may then be rewritten to the first block after the erase. With the enhanced process, a special identification is provided to the data regarding the management of the array stored on another block which is outside the normal identification range for the host computer so that the specially identified data is not lost during a power loss during an erase process and may be detected after power is restored to the system.

16 Claims, 5 Drawing Sheets

METHOD AND APPARATUS FOR RETAINING FLASH BLOCK STRUCTURE DATA DURING ERASE OPERATIONS IN A FLASH EEPROM MEMORY ARRAY

BACKGROUND OF THE INVENTION

1. Field Of The Invention

This invention relates to flash electrically-erasable programmable read-only memories (flash EEPROM) and, more particularly, to methods for retaining data necessary to the management of a block of flash EEPROM during the erasure of that block.

2. History Of The Prior Art

Modern computer systems make extensive use of long term memory. Typically this memory is provided by one or more electro-mechanical hard (fixed) disk drives constructed of flat circular magnetic disks which rotate about a central axis and which have a mechanical arm to write to or to read from positions on the magnetic disk. Hard disk drives are very useful and have become almost a necessity to the operation of personal computers. However, such electro-mechanical drives are relatively heavy, require a significant amount of space within a computer, require a significant amount of the power in use, and are very susceptible to shock. A had drive within a portable computer which is dropped is quite likely to cease functioning with a catastrophic loss of data.

Recently, forms of long term storage other than electro-mechanical hard disk drives have become feasible for use in computers. One of these is flash EEPROM. A flash EEPROM memory array includes a large plurality of floating-gate field effect transistors arranged as memory cells in typical row and column fashion with circuitry for accessing the individual cells and placing the memory transistors of those cells in one of two memory conditions. A flash EEPROM memory cell, like a typical EPROM cell retains information when power is removed. Unlike a typical EPROM cell, however, a flash EEPROM cell may be erased electrically in place within a system.

Flash EEPROM memory has a number of characteristics which adapt it to use as long term memory. It is light in weight, occupies very little space, and consumes less power than electro-mechanical disk drives. More importantly, it is especially rugged. It will withstand, without adverse effects, repeated drops each of which would destroy a typical electro-mechanical hard disk drive.

A difficulty with flash EEPROM, however, is that it must be erased before it can be reprogrammed and it is very slow to erase. Flash EEPROM is erased by applying a high voltage simultaneously to the source terminals of all of the transistors (cells) used in the memory. Because these source terminals are all connected to one another by metallic busing in the array, the entire array must be erased at once. While an electromechanical hard disk will typically store information in a first area of the disk and then rewrite that same area of the disk when the information changes by changing the magnetic field stored in the area, this is not possible with a flash memory array without erasing all of the valid information that remains in the array along with the invalid (dirty) information.

Because of this, a different arrangement is used for erasing dirty sectors of a flash EEPROM array. One such arrangement is disclosed in detail in U.S. patent application Ser. No. 07/969,131, entitled *Method and Circuitry for A Solid State Memory Disk*, S. Wells, filed on Oct. 30, 1992, and assigned to the assignee of the present invention. In that arrangement, the entire array is divided into smaller separately erasable blocks so that when a block is erased the amount of valid data which must be reprogrammed is reduced. Typically, the array is composed of a number of silicon chips; and each such chip includes a number of such blocks. Then, when the information at a data entry changes, the changed information is written to a new sector on an available block rather than written over the old data; and the old data is marked dirty. After some period, the management processes controlling the block will determine that it is necessary to release space tied up in dirty sectors and select a block to clean up. When cleanup occurs, all of the valid data in the selected block is written to a new block with free space; and then the dirty block is erased and put back into use as a clean block of memory. Because of this involved process, it typically takes as much as two seconds to clean up a block of a flash EEPROM array. However, because erasure need not occur with each entry which is rewritten, erasure may be delayed until a block contains a sufficient amount of dirty information that cleanup is feasible. This reduces the number of erasure operations to a minimum and allows erasure to occur in the background when the facilities for controlling the array are not otherwise occupied with reading and writing.

Each block of the array includes a portion called a block structure storage area which is utilized to store data related to the management of the array and specifically of that block. For example, data related to the number of switching operations which that block has undergone are stored in the block structure storage area. Data relating to read and write errors which occur in the operation of the block are also stored in the block structure storage area. This data is accumulated as the block continues to store different sector data throughout its lifetime of use. However, the memory transistors storing this data are also erased along with the other memory transistors whenever the memory transistors of the block are subjected to the erasure voltage. In order to allow the continued accumulation of data useful to the management of the array, this data must be somehow retained and then rewritten to the block after the erase of the entire block has been completed. It is also possible for a power failure to occur during the period after the erasure of a block has begun and before the erasure has been completed. In such a case, the block may not be completely erased, the data remaining is not trustworthy, the status of the block being erased cannot be determined, and all data stored in random access memory has been lost.

It is desirable to provide a method for reliably storing this block structure data so that it may be replaced on the block during normal operations and in case of power failures occurring during erasure. It is also desirable to know that a power failure during erasure has failed to correctly erase a block.

SUMMARY OF THE INVENTION

It is, therefore, an object of the present invention to provide apparatus and a method for reliably storing block structure data during an erase operation in a flash EEPROM memory array. It is another object of the present invention to provide apparatus and a method for discerning a failed erase process, completing that process correctly, and restoring block structure data to a block of a flash EEPROM memory array.

These and other objects of the present invention are realized in a flash EEPROM memory array having a plurality of individual blocks of memory and control circuitry for managing the reading, writing, and erasure of the array, in which data defining the structure on the block of memory being erased is stored both in random access memory and in a flash EEPROM memory sector of the array each time the block is erased. The random access data structure is typically used to restore the data structure after a block is erased. However, the flash EEPROM memory sectors are specially marked so that they may be detected on power up and an erasure which has been aborted by a power failure may be completed and the block structure data restored to the block.

These and other objects and features of the invention will be better understood by reference to the detailed description which follows taken together with the drawings in which like elements are referred to by like designations throughout the several views.

DETAILED DESCRIPTION

Figure 1:
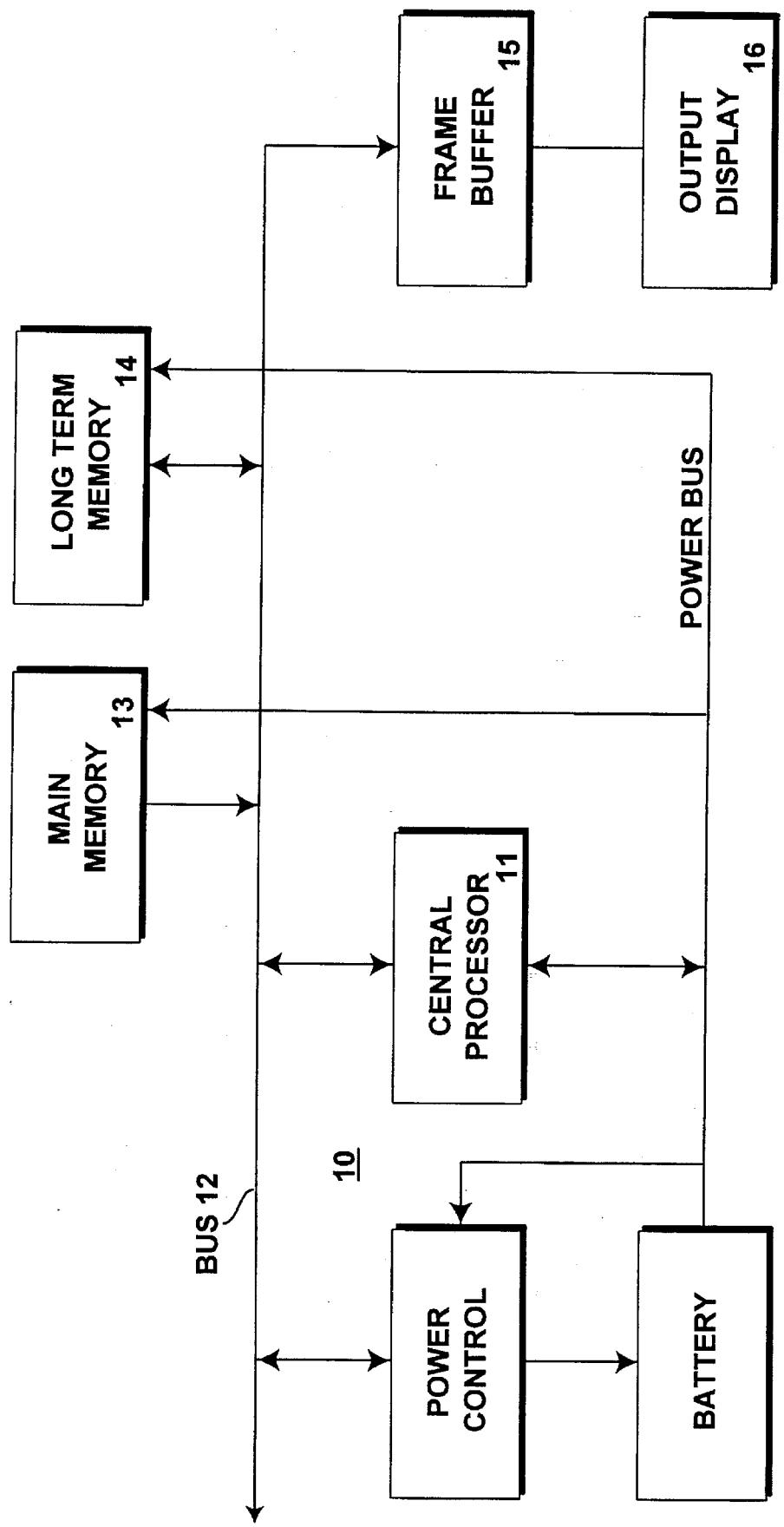
FIG. 1 is a block diagram illustrating a computer system which may include the present invention.

Referring now to FIG. 1, there is illustrated a computer system 10. The system 10 includes a central processor 11 which carries out the various instructions provided to the computer 10 for its operations. The central processor 11 is joined to a bus 12 adapted to carry information to various components of the system 10. Also connected to the bus 12 is main memory 13 which is typically constructed of dynamic random access memory arranged in a manner well known to those skilled in the prior art to store information being used by the central processor during the period in which power is provided to the system 10.

Also connected to the bus 12 are various peripheral components such as long term memory 14. Although long term memory 14 is typically provided by one or more electro-mechanical hard disk drives, such memory may also comprise flash EEPROM memory arrays constructed in a manner to replace the typical electro-mechanical hard disk drives. Such a flash EEPROM memory array is utilized in practicing the present invention. In addition to long term memory 14 and other peripheral components, circuitry may also be coupled to the bus 12 such as a frame buffer 15 to which data may be written for transfer to an output display device 16. Circuitry well known to those skilled in the art may also be utilized to provide power for portable computers in which the present invention is expected to find substantial use.

As outlined above, a flash EEPROM memory array includes a large plurality of transistors arranged as memory cells in an array with circuitry for accessing individual cells and placing the memory transistors of those cells in one of two memory conditions. A flash memory cell, like a typical EPROM cell, retains information when power is removed.

However, unlike the typical EPROM cell, a flash EEPROM cell may be electrically erased in place.

Because flash EEPROM cannot be reprogrammed until it has been erased and because only large portions of such an array can be erased at any time, all of the valid information that remains in a portion of the array which is to be erased must be rewritten to some other area of the array each time the portion of the array is erased or it will be erased along with the invalid "dirty" information in the portion of the array being erased. Since the running of the erase process requires the rewriting of all valid data in the portion to be erased, the preconditioning of the memory cells before erasure, and post erasure repair, the erase process is quite slow; it typically requires between one and two seconds to erase a flash EEPROM array. Such an erase time would seem to preclude the use of flash EEPROM for rapidly changing data.

However, flash EEPROM may be used for long term storage of the rapidly changing data typically stored by an electro-mechanical hard disk using a new method of erasing and rewriting the flash array different than that typically used for electro-mechanical hard disks and which does not slow the overall operation of the system. In the new arrangement for erasing and rewriting a flash EEPROM array disclosed in the U.S. patent application entitled *Method and Circuitry for a Solid State Memory Disk*, referred to above, a long term storage array is comprised of flash memory arranged in a series of blocks, each of which blocks is independently erasable. In one embodiment, the array is divided into a number of silicon chips each of which is subdivided into sixteen blocks. Each of the logical blocks of flash memory is separately erasable from all other such blocks. However, each of the logical blocks of the array typically holds 128 kilobytes of data, sufficient to hold 256 sectors of information normally stored on the tracks of an electro-mechanical hard disk drive. Thus, a thirty chip (fifteen chip pairs) flash memory array with sixteen individually-erasable sub-blocks per chip holds about the same amount of data as does a thirty megabyte electro-mechanical hard disk. Even with this division of data into 240 individually-erasable blocks, erasure of a block effects erasure of such a very large mount of information that to attempt to erase all of the data and then replace the valid data by rewriting each sector each time data is updated would be a practical impossibility.

In order to overcome this problem, in the new arrangement referred to above, data is written to any physical block of the flash memory array which has space available. Thus, data is written to an empty position in the array no matter what the apparent address of the data or the address on the block. A piece of data is written to the next available sector of the block being written, and a lookup table is kept which records the physical position on the block with a logical address. This arrangement of the array allows a first block to be written sector by sector, a second block to be written in the same sequential manner, and so on. When the data in a sector changes so that the sector needs to be rewritten, the data is written to a new physical position, the data in the lookup table is changed to record the new physical position along with the logical sector number, and the first position at which the data was written is marked as dirty. After some period of time, a sufficient number of blocks of the array will be filled that it will be desirable to release space by moving the valid information from some especially dirty block to some other block and erasing the entire block from which the valid information has been moved. This has the effect of freeing up an additional number of sectors equal to all of the sectors on the erased block which have previously been marked as dirty.

An especial advantage of the arrangement is that it allows the erasure of blocks to occur in the background. That is, erasure may be arranged to occur when the facilities of the array are not otherwise occupied with reading and writing. In this manner, the external host computer which is writing to and receiving information from the flash array is typically not aware that an erasure is taking place even though the erasure requires one or two seconds.

Figure 2:
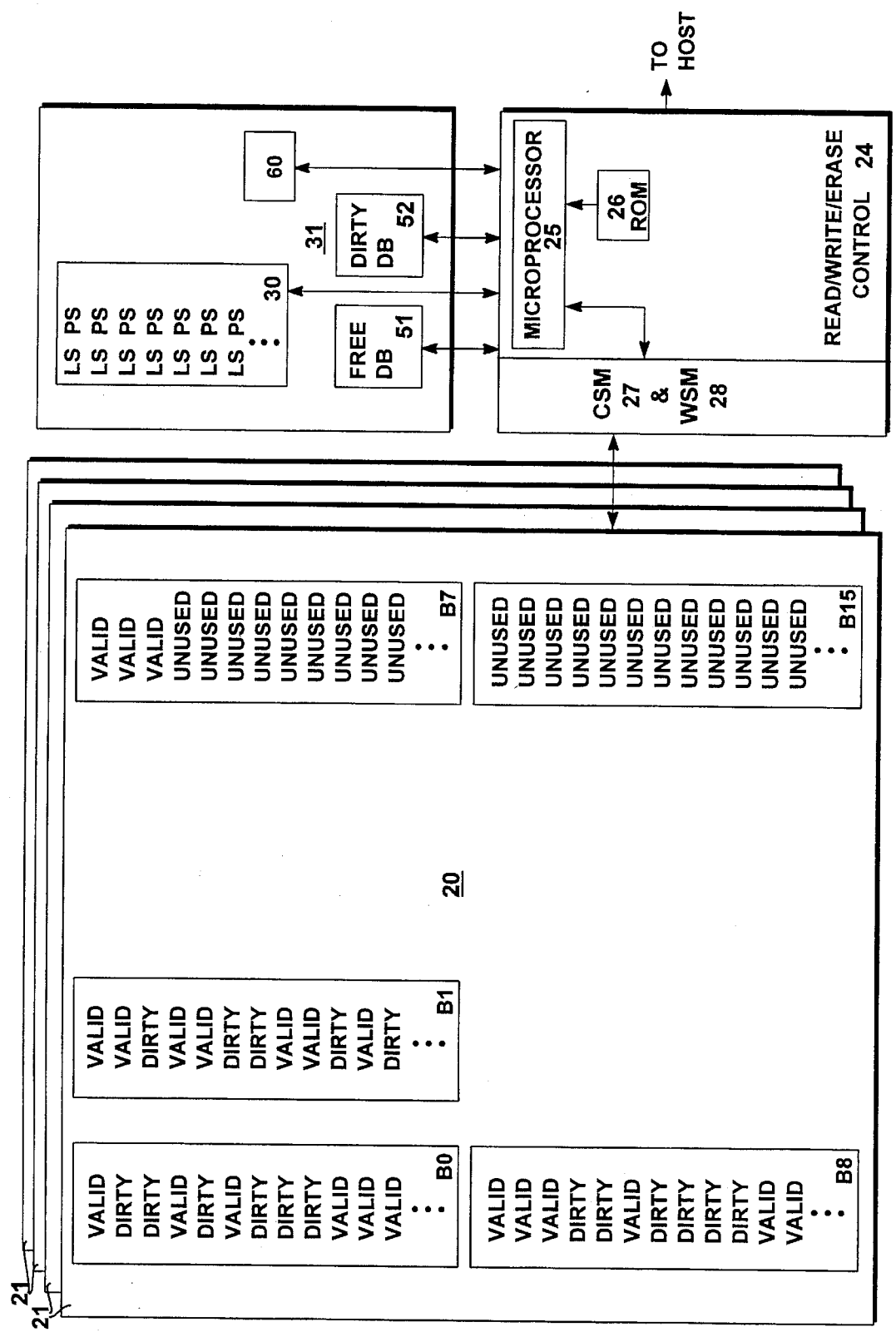
FIG. 2 is a block diagram illustrating a flash EEPROM memory array in which the present invention may be used.

Referring now to FIG. 2, there is illustrated in block diagram form a flash EEPROM memory array 20 in which the present invention may be practiced. The array 20 includes a plurality of blocks B0–B15 of flash EEPROM memory. Each block includes floating-gate field effect transistor memory cells (not shown) arranged in typical row and column fashion and having circuitry arranged for selecting any particular block of memory and any particular row and column so that the memory device at that position may be written or read. The details of the layout of transistor memory arrays and the associated accessing circuitry are well known to those skilled in the art and are, therefore, not shown here.

A flash memory array is essentially an EPROM array with facilities provided so that entire array (or an individually erasable block) may be erased by a high voltage value applied simultaneously to the source terminals of all the memory transistors of the array when the other terminals are suitably biased. Such an erasure places each of the cells in the one condition. When in that condition, a zero or a one may be written to a cell. A one leaves the cell in the same one condition while a zero switches the cell to the zero condition. A cell cannot be switched back from the zero condition to the one condition without the application at its source terminal of the high value of voltage (Vpp) required for erasure. Since the source terminals of all of the memory transistors in a block are joined together, a cell in a zero state remains in that state until the entire block is erased once again.

In the array 20 of FIG. 2, blocks B0–B15 of memory are illustrated positioned on a first chip 21 of the array 20. Additional silicon chips 21 (e.g., thirty) each hold additional blocks of the array 20 to provide a total of 240 blocks in one embodiment. In that embodiment, any block is actually constructed of a pair of sub-blocks which may be positioned on adjacent chips. The sub-blocks have input, output, and selection conductors such that odd bytes of data are stored in one sub-block and even bytes of data on the other sub-block. From this point on in this description, a block may be considered to include such a pair of subblocks.

Once any one of the blocks has been erased, data may be written to any position on the entire block. The operations of reading, writing, and erasing the array 20 are controlled by a control circuit 24 which receives commands and data from the host. The control circuit 24 includes among other things a microprocessor 25 and read only memory 26 which may store processes for operating the microprocessor 25 to accomplish the various control operations described in this specification. In one embodiment of the invention, the read only memory 26 is also a flash EEPROM memory array. The microprocessor 25 and read only memory 26 are used to carry out the processes in accordance with the present invention, For the purpose of this invention, the control circuit 24 may also be considered to include a command state machine 27 and a write state machine 28. Although discussed as a part of the control circuit 24, in one embodiment the command state machine 27 and the write state machine 28 are physically a part of each chip 21.

The control circuit 24 uses the microprocessor 25 to run the various processes stored in the read only memory 26 to control and manage the reading, writing, and erasure of the array 20. The command state machine 27 provides a command interface between the control circuit 24 and the flash EEPROM memory array 20. The command state machine 27 controls the actual transfer of all data sent to and from the flash memory array 20. The command state machine 27 sequences the data transferred from the host (using the write state machine 28) and to the host so that the writing to and reading from the array 20 occur in proper order. A command state machine 27 and a write state machine 28 used for these purposes are described in detail in U.S. patent application Ser. No. 07/655,643, entitled *Command State Machine*, Fandrich et al, filed Feb. 11, 1991, now U.S. Pat. No. 5,463,737 and assigned to the assignee of the present invention, and in U.S. patent application Ser. No. 07/654,375, entitled *Circuitry and Method For Programming and Erasing A Non-volatile Semiconductor Memory*, Kynett et al, filed Feb. 11, 1991, now U.S. Pat. No. 5,448,712 and assigned to the assignee of the present invention.

When a host begins writing data to be stored in the array 20 to some block of the array which has been completely erased, the data to be stored is written sequentially, sector by sector, to that block until that block has been filled with data. Then writing proceeds to the next block having free space. At any point after writing is completed, the information may be read back from the array 20 by interrogating the block and sector at which the data is stored.

In accordance with the arrangement described above, the data is stored in logical sectors which are similar to the physical sectors utilized in storing data on the typical electro-mechanical hard disks of the prior art except that the sectors may be of any size. When the data in a sector changes, the changed data is written to a new empty sector location on some one of the blocks of the array 20, typically the next empty location sector in physical sequence. This, rather than writing over the old information, occurs because the old information can only be rewritten if the entire block on which it is stored is erased. Consequently, the new information is written to a new position on an unfilled block (e.g., block B7), and the old position is marked invalid (dirty) by writing zeroes with the data stored (in a manner to be explained below) to indicate that the data is invalid. It will be recognized that a value of zero may be written to any memory cell without erasing the block of the array.

Because of the arrangement by which data is replaced, the sector number which is used to indicate where data is stored is a logical sector number rather than a physical sector number. This should be contrasted with the physical sector number used to arrange data on the typical electro-mechanical hard disk. In order to allow this to occur, a lookup table 30 (which is stored in a part of a random access memory 31 associated with the controller 24) is utilized with the array 20 so that the physical position in the array 20 at which any particular logical sector exists may be determined.

Also, because of this arrangement by which data is replaced, each block of the array 20 will after some time have a number of entries which are marked dirty and cannot be used for storage. Consequently, the array 20 fills with data as the data previously stored is changed; and a point will come when it is necessary to clear the dirty information from a block in order to provide space for new or changed information to be stored. Typically, the dirtiest block of the array 20 is chosen. This requires the smallest mount of valid data to be moved out to another block of the array since the invalid data need not be moved. Once the valid information is written to another block and the new addresses for the valid data are recorded in the lookup table 30, the block from which the information was read is erased. It is then placed back in operation as an entirely clean block. In order to allow this "cleanup" operation to occur, some number of blocks must be kept in reserve to be used when cleanup is necessary.

Figure 3:
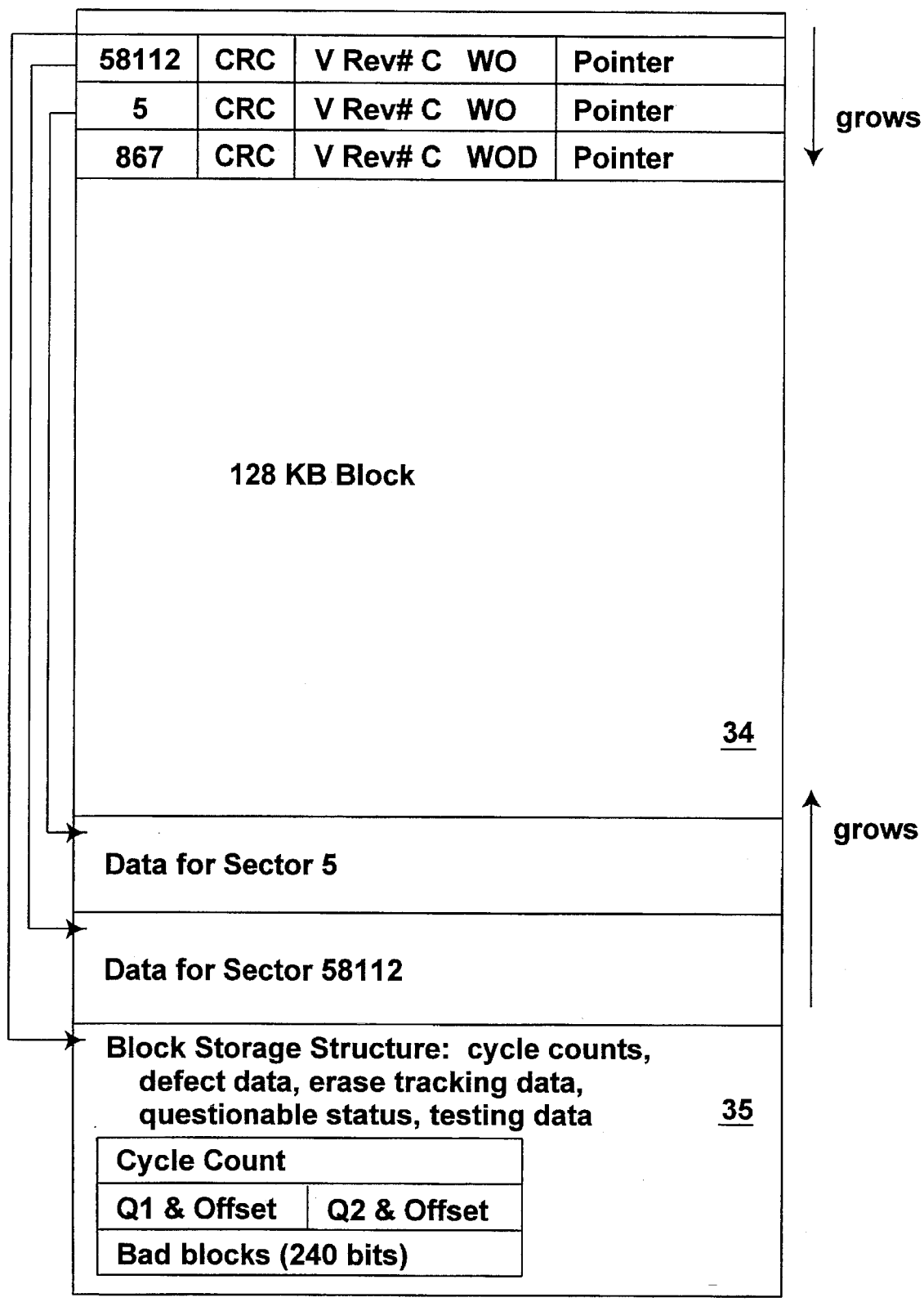
FIG. 3 is a diagram illustrating an individual block of the flash EEPROM memory array of FIG. 1.

FIG. 3 is an idealized drawing useful in understanding the way data is stored on each block of the array 20 in order to obtain the advantages discussed above. FIG. 3 illustrates a typical block 34 as a rectangle. The rectangular area includes a plurality of transistor devices arranged to provide the 128 kilobytes of storage which each block provides. The individual transistors and the various column and row select lines and other conductors for operating the block are not illustrated but are well known to those skilled in the art of designing flash memory.

As may be seen in FIG. 3, data is stored in the block 34 in an area which begins at the top of the block and ends close to the bottom. At the top of the block 34 are stored in identification fields called sector translation tables (or headers) the logical sector numbers used by the operating system as addresses for the data. For example, a first sector number 58112 is stored in the header for the first entry at the top. Following the sector number in each header are stored a cyclical redundancy check value, various attribute bits, and a pointer value. The cyclical redundancy check value is used to check the validity of the header. The attributes included in one embodiment are an indication of the validity of the entry, a revision number, an indication whether the data is compressed or not, and a bit which indicates whether the entry includes data. Other information may also be stored in a header in a particular embodiment. For example, in one embodiment, a byte indicating the length of the sector is stored in the attribute field.

The pointer value points to a physical address on the block 34 (an offset from the beginning physical address on the block) at which the first byte of the data for logical sector 58112 is stored. An arrow in FIG. 3 illustrates this physical position at which the first byte of data for the logical sector 58112 is stored. Since the mount of data to be stored is known at the time of a write operation, in one embodiment of the block 34, the data is stored by writing down to the next previously stored data. In the case of logical sector 58112 which is the first sector on the block 34, the data is written commencing with the address stored as the offset associated with the sector number 58112 to a point at the beginning of the data area which is marked by a beginning pointer value illustrated by an arrow extending from the upper left hand corner of the block 34.

The amount of data written to the logical sector 58112 is not fixed and may vary. However, in the typical interface between the host computer system and the storage system, data is assigned to storage in sectors of 512 bytes. FIG. 3 shows a second logical sector 5 and its pointer directed to a physical position on the block 34 which stores the first byte of the data for sector 5. The data for sector 5 is stored in an area which begins just above the most recent data sector written (sector 58112) and extends downward so that the last row of the new data sector lies in the row just above the first row of sector 58112. FIG. 3 also shows the header for a sector 867. This sector is written without data (WOD). Since the data for each new sector is written in all of the rows immediately above the data for the last-written sector, only a trivial mount of data space (averaging one byte) is wasted in the block storage scheme of the arrangement contrasted with the very large mount of unused space typical to an apparently full hard disk.

In one embodiment, the data stored in any sector of the block 34 may be retrieved by going to the header for the sector and retrieving the pointer to the beginning position of the data and the pointer to the beginning position of the sector whose number is stored immediately preceding the sector number being retrieved. These two values determine the starting and ending positions for the data which is sought in the sector. In the embodiment referred to above which includes an attribute byte indicating the length of the sector, only one access is necessary to retrieve the pointer to the beginning position of the data and the byte containing the length of the sector. As was pointed out above, the logical sector number is stored in a lookup table 30 (which in one embodiment is held in static random access memory 31 on the circuit board which holds the other components of the array 20) with the physical position of the header including the chip number, the block, and the header offset value. This lookup table 30 is maintained by the microprocessor 25 of the control circuit 24.

Below the data storage area on the block 34 is illustrated a block structure storage area 35. The memory transistors in this portion of the block 34 are used to store data used in the management of the block and the array. For example, cycle count data is stored in this area to indicate how many times the block has been erased. Data indicating that defects have occurred in the operation of this block and that the block might have to be removed from operation are stored in questionable storage structures in the block structure storage area 35. These questionable areas are filled as read and write defect detection processes discover problems during the operation of the array 20. Each area 35 also includes an identification of the chip and block on which the area 35 resides. In one embodiment of the invention, block zero of each chip stores a complete map of the bad blocks in the entire array in 240 bits of memory.

The unusual arrangement for rewriting data used by a flash memory array requires that the memory allocation system continually make new or newly-erased free memory space available for data to be written and rewritten. This requires that some number of blocks of the array always be available in order to allow blocks holding dirty data to be cleaned up and their dirty sectors released.

In order to accomplish this, a cleanup process stored in the read only memory 26 is run by the microprocessor 25. The cleanup process selects a particular block of the array to clean up, moves the valid data from that block to free space on some other block, and then erases the dirty block. The details of the cleanup process are disclosed in U.S. patent application Ser. No. 07/969,760, entitled *A Method Of Cleaning Up A Solid State Memory Disk Storing Floating Sector Data,* S. Wells et al, filed on Oct. 30, 1993, and assigned to the assignee of the present invention.

Both the normal cleanup process and another "wear leveling" process (which is used to adjust the number of times each block is erased so that the number of erasures will tend to be similar from block to block) use a block cycle count which is stored in the block structure storage area 35 of each block 34. The wear leveling process is described in detail in U.S. Pat. No. 5,341,339 entitled *Method For Wear Leveling In a Flash EEPROM Memory,* S. Wells, issued Aug. 23, 1994 and assigned to the assignee of the present invention. This process is used because it has been discovered that certain blocks of the array tend to be used more than other blocks to store information which is changing. These blocks tend to be erased more often. The memory transistors on blocks which are erased more often tend to fall sooner than those on blocks which are subject to less use. For this reason, a process which tends to equalize the number of switching operations to which an array of blocks is subjected is used.

Figure 4:
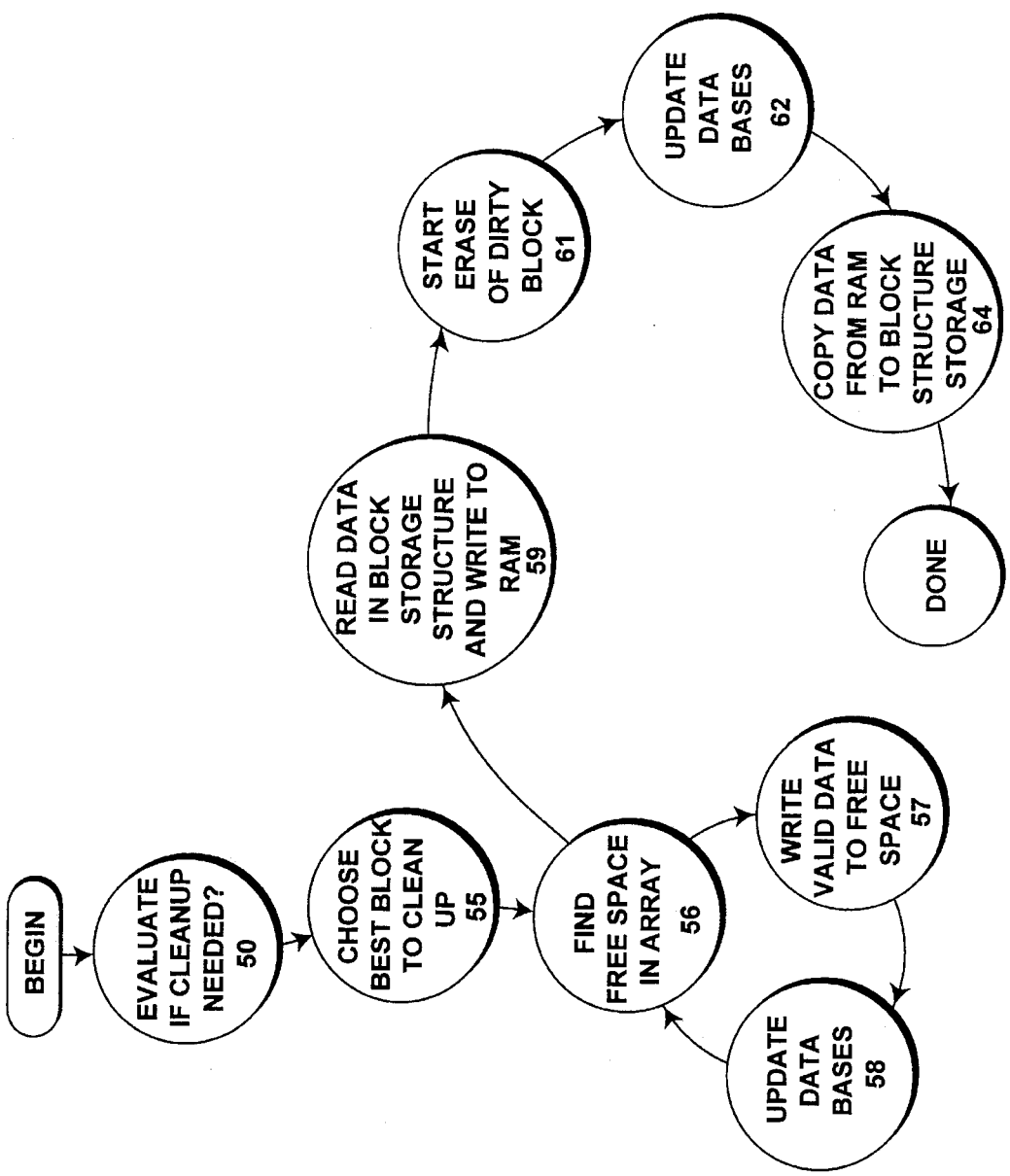
FIG. 4 is a diagram illustrating a first method in accordance with the present invention for storing block structure data during the clean up a flash EEPROM memory array.

FIG. 4 illustrates, in general, a cleanup process modified in accordance with the present invention to provide for storage of the block structure data during cleanup of a block of the array. The operation begins at a first step 50 at which an evaluation takes place to decide whether a cleanup operation is necessary or not. Whether a cleanup is necessary is based on a question of whether there is block space available for writing or rewriting information. In one embodiment, if 80% or more of the total flash array (not including valid sectors which are in use) is dirty, then insufficient space is considered to be available; and it is necessary to perform a cleanup operation. The determination is made by the microprocessor 25 using software stored in read only memory 26 and a first small data base 51 which records the mount of free space (space not already assigned to a sector) both in the array and on each block, and a second small data base 52 which records the mount of dirty space both in the array and on each block in the random access memory 31 associated with the array 20. If sufficient free space exists, cleanup is not necessary. If insufficient free space exists, then cleanup is necessary.

If cleanup is found to be necessary, the program moves to a step 55 in which the block best suited to cleanup is selected. The decision is made based on which block is the dirtiest and which block has been through the lowest number of cleanup operations (cycles). The determination of which block has the lowest number of cleanup operations may be made by looking at the cycle count value of cleanup operations stored in the block structure storage area 35.

For each block, the number of dirty sectors is heavily weighted while the number of cleanup operations is lightly weighted in the choice of which block to clean up. Thus, the dirtiest block value will overwhelmingly affect which block is chosen for cleanup; but, if two blocks are approximately equally dirty, the one having been cycled the least will be chosen. Choosing a block has the ultimate effect of causing the block chosen to be written after the cleanup with data which is most likely to change most rapidly thereafter so that that block will continue to be used more often thereafter. The total effect is that the switching use placed on the blocks begins to be equalized.

Once the appropriate block to clean up has been chosen, the process moves to a step 56 at which available free sector space in other blocks is located. Once the space to store a valid sector has been located by the microprocessor 25 using the table 30, the process moves to step 57 to write the valid data from the sector of the block being cleaned up to the available space. The process writes a header on the block containing the free space. This header includes only a pointer to the offset position on the block for the data for that sector and an indication that data is attached. The process then writes the valid data from the old sector on the block being cleaned up. When the data has been written, the process completes the header with the logical sector number, the cyclical redundancy check value computed from the data, and the valid indication from the old header (and the sector size where the embodiment includes that data in the attributes).

Once the writing of valid data from a sector on the block being cleaned up to a sector on another block has been accomplished, the program moves to a step 58 in which the various data bases kept for the array are updated. This includes updating the sector translation tables (the headers) at the top of each of the blocks which have been affected by the write operations to invalidate the old header, updating the lookup table 30 stored in the random access memory 31 with the new physical address at which the logical sector is stored, and updating the data bases 51 and 52 kept in the random access memory 31 listing the mount of dirty and free space.

After the data bases have been updated for the first sector of valid data moved, the writing of sectors containing valid data continues, looping on itself until all of the valid sectors in the block being cleaned up have been moved to other blocks. When this is complete as will be indicated by the fact that the block contains no clean sectors in the header portion, the process moves to a step 59 at which the data in the block structure storage area (including the cycle count, other block data, and the block and chip addresses) is read and written to a table 60 in random access memory 31.

Once the data from the valid sectors on the block to be erased has been stored and the block structure data has been placed in the table 60, the process moves to a step 61 at which the erase process for the block is started. Once the erase operation has been accomplished, the program moves to a step 62 at which data bases are again updated. These data bases include the cycle count of switching operations which the cleaned up block has undergone, the location of questionable memory cells in the block, the mount of free and dirty space in memory, and other data not pertinent to the present invention. Those of the data bases which reside in the table 60 are updated in that table 60. After the data bases have been brought up to date, the program copies the block structure data from the table 60 in random access memory 31 to the block structure area 35 of the erased block. Thus, by using the table 60 as a temporary storage area for block structure data during erase, the data stored in that area may continue to be accumulated throughout the life of the array 20.

The program then returns to the initial step 50 in which an evaluation of the need for a cleanup occurs. If a cleanup is still necessary to free additional storage occupied by dirty data, the entire process is repeated. This continues until cleanup is no longer necessary.

If an erase operation has started and power is lost to the system, the data in the random access memory 31 is lost. This means that the block structure data cannot be replaced on the newly-erased block from the table 60. Consequently, the cycle count, the questionable block indications and other data stored in that area and used for management of the block and the array are lost. This has a deleterious effect on the operation of the system since the accumulated data is used to determine the operation of the cleanup and wear leveling processing for the entire array and since defect data is used to remove certain defective blocks from the array.

Figure 5:
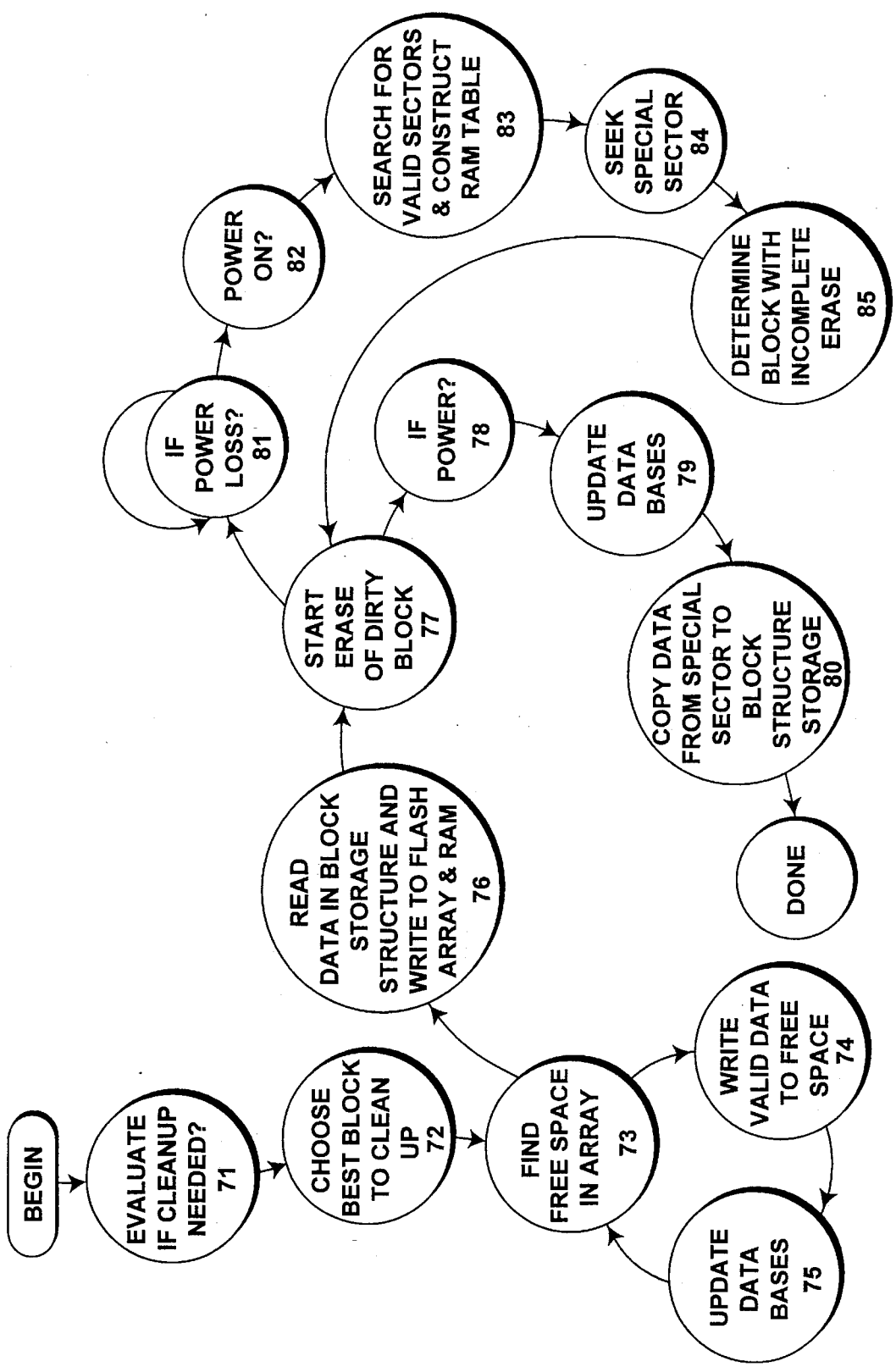
FIG. 5 is a diagram illustrating a method in accordance with the present invention for reliably storing block structure data during cleanup.

The present invention provides an enhanced method for storing the data from block structure storage in such a manner that the loss of power during an erase operation will not cause the loss of the block structure data and the block structure data may be reliably replaced when power is reapplied to the system. This method is illustrated in FIG. 5. The method commences with a step 71 at which an evaluation takes place to decide whether a cleanup operation is necessary or not. Whether a cleanup is necessary is based on a question of whether there is block space available for writing and rewriting information. This evaluation is made on the same basis as was explained above by the microprocessor 25 using software stored in read only memory 26 and the data bases 51 and 52. If sufficient free space exists, cleanup is not necessary. If insufficient free space exists, then cleanup which releases flash memory space is necessary.

If cleanup is found to be necessary, the program moves to a step 72 in which the block best suited to cleanup is selected. The decision is made based on which block is the dirtiest and which block has been through the lowest number of cleanup operations. The decision regarding the dirtiest block is made using the data in the table 52. The determination of which block has the lowest number of cleanup operations is made by looking at the cycle count value of cleanup operations stored in the block structure storage area 35.

For each block, the number of dirty sectors is heavily weighted while the number of cleanup operations is lightly weighted in the choice of which block to clean up. Thus, the dirtiest block value will overwhelmingly affect which block is chosen for cleanup; but, if two blocks are equally dirty, then the least cycled block will be cleaned up.

Once the appropriate block to clean up has been chosen, the process moves to a step 73 at which available free sector space in other blocks is located. When the choice has been made, valid data is moved from a first sector on the block step 74.

Once the writing of valid data in a sector on the block being cleaned up to a sector on another block has been accomplished, the program moves to a step 75 in which the various data bases kept for the array are updated. This includes updating the sector translation tables (the headers) at the top of each of the blocks which have been affected by the write operations to invalidate the old header, updating the new physical address in the lookup table 30 stored in the random access memory 31, and updating the data bases 51 and 52 kept in the random access memory 31 listing the mount of dirty and free space.

After the data bases have been updated for the first sector of valid data moved, the writing of sectors containing valid data continues, looping on itself until all of the valid sectors in the block being cleaned up have been moved to other blocks. Once all of the valid data has been moved to a new block (indicated by the block containing no clean sectors in the header portion), the program moves to a step 76 at which the data in the block structure storage area is read. However, the data is written not only to the table 60 in random access memory 31 but is also written to a new sector in some block of the flash EEPROM array having free space. The new sector is assigned a header in the normal manner of all data. However, a special logical sector number is assigned to this header by the cleanup process. The logical sector number is chosen to be out of the rage of the sector numbers which may be accessed by the host computer with which the array 20 is associated. The data is transferred from the block structure storage area 35, and the area is invalidated.

Once this data has been stored in a block of flash EEPROM memory in the array, the process moves to a step 77 at which the erase process for the block is started. Assuming that power continues to be provided to the system (step 78), the erase process is accomplished. Once the erase operation has been accomplished, the program moves to a step 79 at which data bases including the cycle count stored in the table 60 in the random access memory 31 are again updated. The block structure data from the special sector is then copied to the newly erased block, step 80. After the data base has been brought up to date, the cleanup process places an invalid mark in the header of the special sector in the flash EEPROM array 20 in which the data base was stored in case of a power failure.

During the normal operation of the array, the change in the cleanup process has no effect on operation. However, if power is removed from the array 20 during the erasure of a block of the array which is being cleaned up (step 81), the data of the block structure storage area remains in the special sector of the flash EEPROM array. When power is reapplied to the system (step 82), the "startup" process reconstructs the table 30 in random access memory by searching through the array for all valid sectors on all of the blocks, step 83. The table 30 lists the sector number, the chip number, the block number, and the physical offset of each sector. The table 30 which is reconstructed includes the special sector including the data from the block structure storage area 35 of the incorrectly-erased block. The table will not include any sectors stored from the incorrectly erased blocks because the header data (including the cyclical redundancy check value) will demonstrate that the data is corrupted and not valid.

Once the table is reconstructed, the power up process seeks for any special erase sector number, step 84. If it finds such a sector, the process knows that an erase was not correctly completed. The process reads the chip and block numbers of the incorrectly erased block from that specially-numbered sector, step 85. The process then finds the block and recommences the erase process. When the erase process is completed, the data in the specially-numbered erase sector is read and written to the block structure storage area of the newly erased block. The header of the specially-numbered erase sector is then invalidated, and the process is finished.

Thus, as may be seen, the process of the present invention allows the reliable storage of the data in the block structure storage area even though power may be removed from the system during the erasure of the block during a cleanup operation.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for reliably storing management data in the event of a power loss in a memory array including a plurality of devices which are capable of retaining data when power is removed, wherein the array is divided into a plurality of individually-erasable blocks of memory cells and each of the blocks of memory cells has stored thereon data regarding management of the array, the method, during a process in which valid data stored in a first block is written to another block of the array, and then the first block is erased, comprising the steps of:

storing management data regarding management of the array from the first block onto a second block before erasure of the first block;

providing a detectable identification to the management data on the second block;

storing the detectable identification onto the second block;

seeking the detectable identification when power is applied to a system after the power loss;

reading the management data from the second block;

erasing the first block; and writing the management data to the first block.

2. A method for reliably storing management data in a memory array as claimed in claim 1 in which the memory array is a flash EEPROM memory array.

3. A method for reliably storing management data in a memory array as claimed in claim 1 in which the management data includes data for identifying the first block.

4. A method for reliably storing management data in a memory array as claimed in claim 1 in which the detectable identification is an identification which is outside a normal range for data stored in the memory array.

5. A process for use with a memory array having a plurality of blocks of EEPROM memory cells, wherein each of the plurality of blocks stores data provided by a host as well as data relating to management of the array, the process for preserving the data relating to management of the array in the event of a power loss during erasure of a first block of the plurality of blocks comprising the steps of:

writing valid data provided by the host from the first block to a second block of the memory array;

reading the data relating to management of the array from the first block;

writing the data relating to management of the array to a third block of the memory array;

writing an identification outside a range accessible by the host to the third block;

reading the data relating to management of the array from the third block after erasing the first block; and writing the data relating to management of the array to the first block.

6. A process as claimed in claim 5 further comprising the steps of:

seeking data having the identification on application of power to the host;

identifying the first block if the identification is found;

erasing the first block; and writing the data relating to management of the array to the first block after erasure is complete.

7. A process as claimed in claim 6 in which the memory array is a flash EEPROM memory array.

8. A method for reliably identifying an incomplete erasure of blocks of an EEPROM memory array in a memory array having a plurality of blocks of EEPROM memory cells due to a power loss, wherein each of the plurality of blocks stores data provided by a host as well as data relating to management of the array, and wherein invalid data is removed from the memory cells of the array by a process of writing valid data provided by the host from the first block to another block of the memory array, and then the first block is erased, the method comprising the steps of:

writing the data relating to management of the array from the first block to a second block of the memory array after all of the valid data provided by the host has been written to a third block of the memory array;

writing a special identification outside a range accessible by the host to the second block;

seeking data having the special identification stored with the data relating to management of the array on application of power to the host after the power loss;

identifying the first block if the special identification is found;

erasing the first block; and writing the data relating to management of the array to the first block after erasure is complete.

9. A method as claimed in claim 8 in which the memory array is a flash EEPROM memory array, and in which the data relating to management of the array includes an identification of the first block.

10. A method for preserving management data in a memory array in the event of a power loss, wherein the memory array includes a plurality of memory cells which are capable of retaining data when power is removed, wherein the array is divided into a plurality of individually-erasable blocks of memory cells and each of the blocks of memory cells has stored thereon data regarding management of the array, the method, during a process in which valid data stored in a first block is written to another block of the array, and then the first block is erased, comprising the steps of:

storing management data regarding management of the array from the first block onto a second block of the array before erasure of the first block;

providing a detectable identification to the management data:

updating the management data before rewriting that data to the first block; and rewriting the management data to the first block after the erasure of the first block.

11. A method for preserving management data in a memory array as claimed in claim 10 further comprising the steps of seeking the detectable identification when power is applied to a system after a power loss, reading the management data from the second block, erasing the first block, and writing the management data to the first block.

12. A method for preserving management data in a memory array as claimed in claim 10 in which the memory array is a flash EEPROM memory array.

13. A method for preserving management data in a memory array as claimed in claim 10, wherein the management data includes data for identifying the first block.

14. A method for preserving management data in a memory array as claimed in claim 10, wherein the detectable identification is outside a normal range for data stored in the memory array.

15. A process for use with a memory array having a plurality of blocks of EEPROM memory cells, wherein each of the plurality of blocks stores data provided by a host as well as data relating to management of the array, the process for preserving the data relating to management of the array in the event of a power loss during erasure of a first block of the plurality of blocks comprising the steps of:

writing valid data provided by the host from the first block to a second block of the memory array;

writing the data relating to management of the array from the first block to random access memory;

writing the data relating to management of the array from the first block to a third block of the memory array;

writing an identification outside a range accessible by the host with the data relating to management of the array;

updating the data relating to management of the array stored in random access memory; and rewriting the data relating to management of the array stored in random access memory to the first block after the erasure of the first block.

16. A process as claimed in claim 15 further comprising the steps of:

seeking data having the identification outside the range accessible by the host stored with the data relating to management of the array on application of power to the host;

identifying the first block if the identification is found;

erasing the first block; and writing the data relating to management of the array to the first block after erasure is complete.

* * * * *